(12) United States Patent
Yedidia et al.

(10) Patent No.: US 7,376,173 B2
(45) Date of Patent: May 20, 2008

(54) UNAMBIGUOUSLY ENCODING AND DECODING SIGNALS FOR WIRELESS CHANNELS

(75) Inventors: Jonathan S. Yedidia, Cambridge, MA (US); Andreas F. Molisch, Arlington, MA (US); Karunakar Pedagani, Santa Clara, CA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 661 days.

(21) Appl. No.: 10/950,772

(22) Filed: Sep. 27, 2004

(65) Prior Publication Data

US 2006/0067382 A1 Mar. 30, 2006

(51) Int. Cl.
*H04B 1/00* (2006.01)

(52) U.S. Cl. .............. 375/141; 375/130; 375/140; 375/303; 455/42; 455/43; 455/44; 455/45; 370/203; 708/403; 708/404; 708/405

(58) Field of Classification Search .............. 375/141, 375/130, 140, 303
See application file for complete search history.

(56) References Cited

U.S. PATENT DOCUMENTS

| | | | | |
|---|---|---|---|---|
| 6,963,891 B1* | 11/2005 | Hoyle | .............. | 708/404 |
| 7,023,897 B2* | 4/2006 | Kurihara | .............. | 375/130 |
| 7,126,998 B2* | 10/2006 | Vadde | .............. | 375/260 |
| 7,191,376 B2* | 3/2007 | Yedidia | .............. | 714/751 |
| 7,203,157 B2* | 4/2007 | Castelain | .............. | 370/203 |
| 7,215,635 B2* | 5/2007 | Song et al. | .............. | 370/208 |
| 7,228,480 B1* | 6/2007 | McEwen et al. | .............. | 714/746 |
| 2003/0145026 A1* | 7/2003 | Jin | .............. | 708/404 |
| 2005/0220203 A1* | 10/2005 | Ojard | .............. | 375/261 |
| 2005/0232137 A1* | 10/2005 | Hosur et al. | .............. | 370/208 |
| 2005/0243938 A1* | 11/2005 | Armstrong et al. | .............. | 375/260 |

OTHER PUBLICATIONS

S. Kaiser, "Trade-off Between Channel Coding and Spreading in Multi-carrier CDMA Systems," Proc. ISSSTA 1996, pp. 1366-1370, 1996.

F.R. Kschischang, B.J. Frey, and H-A. Loeliger, "Factor Graphs and the Sum-Product Algorithm", IEEE Transactions on Information Theory, vol. 47, pp. 498-519, Feb. 2001.

(Continued)

*Primary Examiner*—Shuwang Liu
*Assistant Examiner*—Kenneth Lam
(74) *Attorney, Agent, or Firm*—Dirk Brinkman; Clifton D. Mueller; Gene VinoVur

(57) ABSTRACT

A method encodes a sequence of blocks of input bits to be transmitted over a wireless channel. Each block of input bits is converted to a codeword, and each codeword is mapped to multiple sub-blocks of complex numbers. Each sub-block is multiplied by a disambiguating spreading transform to obtain a sub-block of transformed symbols, which can be modulated and transmitted to a receiver, where each received block is demodulated to a block of complex numbers, which are partitioned into sub-blocks. The sub-block of complex numbers are converted to a set of likelihood ratios that correspond to decoded codewords. The input bits can be decoded unambiguously even if only one of the blocks of symbols corresponding to the block of input bits is received correctly.

17 Claims, 8 Drawing Sheets

OTHER PUBLICATIONS

J.S. Yedidia, "*Sparse Factor Graph Representations of Reed-Solomon and Related Codes*," MERL TR2003-135, Mitsubishi Electric Research Laboratories, Cambridge, MA, Dec. 2003.

S. Tavildar and P. Viswanath, "Permutation Codes: Achieving the Diversity-Multiplexing Tradeoff", International Symposium on Information Theory (ISIT), Jun. 27, 2004.

Serener et al., "Performance of Spread OFDM with LDPC Coding in Outdoor Environments," IEEE 58th Annual Vehicular Technology Conference, vol. 1, pp. 318-321, 2003.

Yedidia et al., "New Spreading Transforms for Fading Channels," 42nd Annual Allerton Conference on Communication, Control and Computing, pp. 1-12, Sep. 29, 2004.

* cited by examiner

100

UNAMBIGUOUSLY ENCODING AND DECODING SIGNALS FOR WIRELESS CHANNELS

FIELD OF THE INVENTION

The present invention relates generally to encoding radio signals, and more particularly to encoding signals to be transmitted over wireless channels subject to fading, interference, and noise.

BACKGROUND OF THE INVENTION

Wireless Communications

Wireless communications devices allow a degree of convenience and mobility that wired devices cannot match. However, wireless communications systems are subject to problems that do not occur to the same degree for wired systems. Foremost among these problems is fading. Fading is the time-variation of channel conditions. A second problem is interference between multiple signals that concurrently use the same part of the frequency spectrum.

As the transmission rate of wireless communications continues to increase, the frequency selectivity of the wireless channel is a major issue. A 'frequency-selective' channel is one for which the propagation is a strong function of frequency within the bandwidth of the channel.

Orthogonal Frequency Division Multiplexing (OFDM)

One popular method to deal with frequency-selective channels is orthogonal frequency division multiplexing (OFDM). OFDM is used in wireless local area networks, as covered in the IEEE 802.11a, 802.11g, and 802.11n standards, as well as fixed wireless access systems, as covered in the IEEE 802.16 standards, and high mobility systems for high data rates, as covered in the IEEE 802.20 standards. Anticipated fourth generation cellular telephone systems are also expected to use OFDM.

The basic principle of OFDM is to partition a frequency-selective wide-band channel into a number of parallel, narrow-band sub-channels, also called 'sub-carriers', or 'tones'. Each sub-channel is frequency-nonselective, i.e., non-delay-dispersive. This principle is similar to traditional frequency division multiple access (FDMA). There are, however, major differences between OFDM and FDMA. In OFDM, the frequencies of the sub-channels are spaced as close as possible, without causing mutual interference, i.e., each sub-channel is located in the spectral nulls of the adjacent sub-channels. In OFDM, the conversion to parallel sub-channels can be done digitally, by means of a fast Fourier transform (FFT). In OFDM, a guard interval in the form of a 'cyclic prefix', ensures that even in the presence of a residual delay dispersion, the sub-channels do not interfere with each other, as long as the delay spread of the channel is shorter than the duration of the cyclic prefix.

A discrete-time effective channel model for a system using OFDM is given by the following system of equations. The symbol encoded by the OFDM system on the $l^{th}$ sub-channel at discrete time t is denoted by $x_l[t]$. The corresponding received symbols $y_l[t]$ after being processed by the OFDM system are given by $$y_l[t] = H_l[t] x_l[t] + n_l[t]. \quad (1)$$

Here, $H_l[t]$ is a random variable called the attenuation or 'fading' factor for the $l^{th}$ sub-channel at time t. The noise $n_l[t]$ is a zero-mean random variable chosen from a Gaussian distribution. The symbols $x_l[t]$ and $y_l[t]$, the attenuation factor $H_l[t]$, and the noise $n_l[t]$ are all represented as complex numbers.

The 'equalization' of OFDM systems is simple. Because each sub-channel is effectively narrow-band, the signal received for this sub-channel needs only to be divided by the complex number $H_l[t]$ representing the attenuation at this specific sub-carrier.

Models for Fading and Interference

Depending on the specific application, different probability distributions are appropriate for the random variables $H_l[t]$. If the variables $H_l[t]$ are selected from a complex Gaussian distribution with zero mean, then the model is called a 'Rayleigh' fading model. Rayleigh fading models are very popular models for wireless channels.

If the $H_l[t]$ for the same sub-carrier at neighboring discrete times are correlated, then the model is called a 'slow-fading' channel. If the $H_l[t]$ for the same sub-carrier at neighboring discrete times are independent, then the model is called a 'fast-fading' channel.

A simplified model for interference is obtained using an 'erasure' model for the probability distribution of $H_l[t]$. In this model, each fading factor $H_l[t]$ is independently selected to be one, with a probability $1-p_e$, and zero, with a probability $p_e$. The zeros represent interference caused by other signals that occur with probability $p_e$.

Lack of Frequency Diversity in OFDM

Unfortunately, each sub-channel in an OFDM system is effectively narrowband. Therefore, OFDM, by itself, does not give any frequency diversity when a sub-carrier is in a fading dip or an erasure. If $H_l[t]$ has a small magnitude, then its signal-to-noise-ratio (SNR) is low, and the corresponding received symbol is decoded with a high probability of error.

This problem can be solved in several possible ways. First, if the instantaneous SNR for each sub-carrier is known at the transmitter, then adaptive modulation, in combination with appropriate codes, can ensure that the signaling rate for each specific sub-carrier is at an appropriate level that can be sustained without too many errors. Second, if the transmission of the data occurs over a time duration that is much longer than the coherence time of the channel, then appropriate codes combining symbols at the same sub-carrier but over different times can exploit the changes over time in the channel conditions. Third, error-correcting codes can be used across different sub-carriers at the same time. This very common approach is called 'coded' OFDM.

However, there are many practical situations where none of the above approaches is optimal, or even possible. The first approach requires instantaneous channel state information at the transmitter, which imposes a large feedback overhead, as well as a large modulation alphabet, which imposes hardware constraints. The second approach requires coding over a long time, which is not desirable in many cases, particularly when long delays cannot be tolerated. Furthermore, long period encoding may be impossible in situations where there is insufficient time diversity, such as in fixed wireless access. Encoding across frequency using an error-correcting code often requires the use of low code-rate codes in order to be effective. That means that an excessive number of redundant symbols are transmitted, decreasing the effective throughput on the channel.

MC-CDMA

For these reasons, another approach called 'multi-carrier code division multiple access' (MC-CDMA) can be used, see K. Fazel, "Performance of CDMA/OFDM for Mobile Communications Systems," ICUPC 1993, vol. 2, pp. 975-979, 1993, and S. Kaiser, "Trade-off Between Channel Coding and Spreading in Multi-carrier CDMA Systems," Proc. ISSSTA 1996, pp. 1366-1370, 1996. In that approach, a data block, on different sub-channel frequencies, is multiplied by a Walsh-Hadamard transform (WHT). This multiplication spreads the information for each symbol over all available tones. The number of symbols that are multiplied is the same as the number of tones, giving a code-rate of one, so that no redundancy is introduced. Because all symbols are transmitted on all tones simultaneously, the system fully exploits the frequency diversity in all channels. Even if some tones are in fading dips, the information from the 'good' tones is sufficient to allow reconstruction of the transmitted symbols, in most, but not all cases.

MC-CDMA can be used in ordinary OFDM systems or in coded OFDM systems. When used with coded OFDM systems, the idea is to reduce the redundancy needed in the error-correcting code.

FIG. 1 shows a prior art transmitter or 'encoder' 100 for a coded OFDM system using multi-carrier CDMA. Data bits 101 emitted by a source are encoded 110 using an error-correcting code, and thus redundant bits are added to make code words 102. The resulting code words 102 are mapped 120 into a block of complex symbols 103. In the MC-CDMA part of the transmitter, the resulting block of complex symbols are multiplied by a WHT matrix 130 to obtain an equal-length block of complex symbols 104. The resulting equal-length block of symbols is converted 140 into a continuous-time signal 105 in the OFDM part of the transmitter by adding a cyclic prefix and applying an inverse FFT.

The functions of the MC-CDMA part of the transmitter can be expressed as follows. The input at discrete time t is a data block of complex symbols $\{u_l[t]\}$, and the number of sub-channels N is equal to some power of two. To obtain the block of complex symbols $\{x_l[t]\}$ that is sent to the inverse FFT, we multiply by the N×N WHT matrix $W^N$:

$$x_l[t] = \sum_{m=1}^{N} W^N_{lm} u_m[t]. \quad (2)$$

Walsh-Hadamard Transform Matrices

WHT matrices can be constructed recursively as follows. The smallest version is a 2×2 matrix $W^2$ of the form $$W^2 = \frac{1}{\sqrt{2}} \begin{pmatrix} 1 & 1 \\ 1 & -1 \end{pmatrix}. \quad (3)$$

To construct a larger WHT matrix $W^N$, where $N=2^B$, one forms a Kronecker product of B 2×2 WHT matrices. Thus, the WHT matrix $W^4$ is given by $W^4=W^2W^2$, and $W^8=W^2W^2W^2$, and so on. The expression '$W^2M$' means that one expands every 1 in the matrix M into a sub-matrix $W^2$, and every −1 into a sub-matrix $-W^2$. Thus, for example, the next two WHT matrices after $W^2$ are $$W^4 = \frac{1}{2} \begin{pmatrix} 1 & 1 & 1 & 1 \\ 1 & -1 & 1 & -1 \\ -1 & -1 & 1 & 1 \\ -1 & 1 & 1 & -1 \end{pmatrix} \quad (4)$$

and $$W^8 = \frac{1}{\sqrt{8}} \begin{pmatrix} 1 & 1 & 1 & 1 & 1 & 1 & 1 & 1 \\ 1 & -1 & 1 & -1 & 1 & -1 & 1 & -1 \\ -1 & -1 & 1 & 1 & -1 & -1 & 1 & 1 \\ -1 & 1 & 1 & -1 & -1 & 1 & 1 & -1 \\ -1 & -1 & -1 & -1 & 1 & 1 & 1 & 1 \\ -1 & 1 & -1 & 1 & 1 & -1 & 1 & -1 \\ 1 & 1 & -1 & -1 & -1 & -1 & 1 & 1 \\ 1 & -1 & -1 & 1 & -1 & 1 & 1 & -1 \end{pmatrix}. \quad (5)$$

Factor Graph Representations of Fast Walsh-Hadamard Transforms

Naively, a multiplication using a WHT matrix as in equation (2) appears to require approximately $N^2$ computations. However, the multiplication can be done in a 'fast' way requiring on the order of $N \log_2 N$ operations. The 'fast' Walsh-Hadamard transform is analogous to a FFT.

To explain the fast WHT, it is easiest to use a 'factor graph'. For a detailed explanation of factor graphs, see F. R. Kschischang, B. J. Frey, and H-A. Loeliger, "*Factor Graphs and the Sum-Product Algorithm,*" IEEE Transactions on Information Theory, vol. 47, pp. 498-519, February 2001. There are several essentially equivalent forms of factor graphs. The following discussion is based on so-called 'normal' factor graphs, as described by G. D. Forney, Jr., "*Codes on Graphs: Normal Realizations,*" IEEE Transactions on Information Theory, vol. 47, pp. 520-548, February, 2001.

A normal factor graph is drawn as a collection of connected vertices. The connections between the vertices, which are drawn as lines, represent 'variables'. The vertices, which are drawn as squares and referred to as 'factor nodes' represent constraints placed on the variables that connect to that factor node. In a 'normal' factor graph, each variable can be connected to either one or two factor nodes, and each factor node can connect to one or more variables.

The factor graph for a fast Walsh-Hadamard transform can be constructed using 'butterfly' factor nodes, as described by J. S. Yedidia, "*Sparse Factor Graph Representations of Reed-Solomon and Related Codes,*" MERL TR2003-135, Mitsubishi Electric Research Laboratories, Cambridge, Mass., December, 2003, and Proceedings of the 2003 DIMACS Workshop on Algebraic Coding Theory, September 2003. A butterfly factor node has two 'input' variables entering the node from the left, and two 'output' variables exiting the node from the right.

In a butterfly factor node, there are two constraints on the variables. The two input variables are denoted by $x_1$ and $x_2$, and the two output variables are denoted by $y_1$ and $y_2$. The two constraints are written as $$y_1 = Ax_1 + Bx_2 \quad (6)$$

$$y_2 = Cx_1 + Dx_2 \quad (7)$$

where A, B, C, and D are constants. The choice of the four constants in these equations defines the specific form of a butterfly factor node.

As shown in FIG. 2, a prior art butterfly factor node 201 is drawn as a square with the four constraint constants (A, B, C, D) placed inside the node, and with the input variables 211 represented by connected lines coming into the square from the left, and the output variables 212 represented by connected lines coming out of the square to the right. The prototypical butterfly factor node 201 corresponds to equations (6) and (7) above.

FIG. 3 shows a prior art factor graph 300 for a fast Walsh-Hadamard transform of size N=8. The factor graphs for the fast Walsh-Hadamard transforms is constructed using butterfly factor nodes 301 where the constants are given by A=B=C=1/√2, and D=−1/√2. The factors are connected in a regular way that is identical to the wiring in FFTs. The input variables 302 on the left are the variables $u_m$, the output variables 303 on the right are the variables $x_l$, and the factor graph implements the relationship $$x_l = \sum_{m=1}^{N} W_{lm}^N u_m. \qquad (8)$$

OFDM Receivers

FIG. 4 shows a conventional receiver (decoder) 400 for a prior art coded OFDM system that uses MC-CDMA. The receiver 400 takes the received signal 401, and then in step 410, performs an FFT and removes the cyclic prefix to obtain a block of corrupted complex symbols 402. Then, an inverse WHT is performed 420 to recover complex symbols 403. Finally, complex symbols are decoded 430 using an error-correcting code to obtain a reconstruction 404 of the original transmitted bits.

There are two main problems in the decoders for systems that use MC-CDMA. One is related to the performance when simplified decoding methods are used. The simplest decoding approach is to multiply the received signal with the inverse of the Walsh-Hadamard matrix after equalization of each OFDM tone, and before demodulation and decoding. Unfortunately, this decoding approach leads to noise enhancement. The noise from the 'bad' tones with a low SNR, which are amplified in the equalization process, is distributed over all tones. This problem can in principle be solved using maximum-likelihood or optimal detection for the inverse WHT. However, processing-time considerations limit maximum-likelihood detection to very small Walsh-Hadamard matrices.

The second problem with MC-CDMA systems using Walsh-Hadamard transforms is related to the performance of decoding in the presence of many sub-channel 'erasures' due to bad SNRs, as may be created by fading dips or interference on channels. Unfortunately, because of the form of the WHT matrix, several different bit combinations can lead to the same complex symbol being transmitted on a single tone. As a simple example, suppose that a 2×2 WHT matrix is used, and the possible input symbols are 1.0 and −1.0. The first output symbol after a Walsh-Hadamard transform is the sum of the two inputs divided by √2. If the first output symbol is received as a 0.0, then that symbol could have arisen because the first input was a 1.0 and the second input was a −1.0, or vice versa. Naturally, the combination of the information of all tones is sufficient for a demodulation. However, if some tones are erased, then the reconstruction 404 can be ambiguous when a Walsh-Hadamard transform is used. Therefore, it is desired to use a different spreading transform for which an unambiguous choice of the reconstruction can be made so long as at least one output symbol is received correctly.

Asymmetrical Spreading Transforms

For the particular case of a 2×2 spreading matrix, it is known that a considerable performance improvement can be realized by using an asymmetrical spreading matrix of the form $$U = \begin{pmatrix} 2 & 1 \\ -1 & 2 \end{pmatrix}.$$

This spreading matrix enforces a transmit symbol constellation that enables reconstruction even if one of the two tones that carry the information about one bit is erased.

A similar idea is described for a transform that spreads symbols across time or space with different transmitting antennas using 'permutation codes', S. Tavildar and P. Viswanath, "Permutation Codes: Achieving the Diversity-Multiplexing Tradeoff", International Symposium on Information Theory (ISIT), Jun. 27, 2004.

However, the prior art transforms are only described for very small N. The only explicit constructions are for cases when the number of sub-carriers is two. It is well known that larger values of N are necessary to obtain a diversity gain that is possible by spreading out a symbol over many different sub-carriers.

To summarize, prior art methods exist for spreading symbols across multiple sub-carriers using a WHT. All of those methods suffer from two problems. There is ambiguity during the decoding when some of the sub-carriers are in deep fades. Noise from faded sub-carriers is amplified when simple decoding methods are used. Some prior art methods spread a symbol across two sub-carriers in a way that can be disambiguated, even if one of the sub-carriers is erased. However, there are no prior art methods for spreading symbols across more than two channels without suffering from the problem of ambiguity when some of the sub-carriers are in deep fades.

Therefore, it is desired to provide a method for spreading symbols to be transmitted over more than two sub-carriers subject to fading, interference, and noise, so that it is possible to reconstruct the symbols unambiguously symbols for MC-CDMA in OFDM systems. There is a similar need for spreading symbols across time-division multiple access (TDMA) or across multiple receive antenna and multiple transmit antenna (MIMO) systems.

In general, it is desired to provide a signal encoding method that is effective for any channel model that can be written in a form similar to that given in equation (1), where the indices l and t represent alternative sub-channels over which symbols are transmitted.

SUMMARY OF THE INVENTION

The present invention provides a method and system for encoding an input signal into a transformed signal that is suitable for transmission over a fading channel. In addition, the invention provides a corresponding method to decode unambiguously a received version of the transformed signal, even if the signal is corrupted during transmission.

The encoding method transforms the input signal as follows. The input signal is first mapped optionally to a sequence of N codewords using an error-correcting code. The sequence of N codewords is partitioned into sub-blocks of complex numbers, each having a length n which is a power of two.

Each sub-block is multiplied separately by a spreading transform matrix. The spreading transform matrix has a form that can be determined using a factor graph representation. The factor graph can also be used to perform directly the multiplication.

More specifically, the transform according to the invention is a disambiguating spreading transform.

In an OFDM system, the resulting transformed sequence of complex numbers is converted into a continuous-time signal in a conventional way by adding a cyclic prefix, and applying an inverse fast Fourier transform.

The decoding method reconstructs the input signals as follows. For each sub-sequence, the received values of the complex symbols are compared to possible values of the received signals for different possible input sub-sequences. Marginal likelihoods for each possible input signal, given the received symbols, are determined.

The marginal likelihoods can also be determined using an approximate method when a size of the sub-sequences is large.

The marginal likelihoods are input into a decoder for the error-correcting code. The output of the decoder is a reconstruction of the input signal.

DETAILED DESCRIPTION OF THE PREFERRED EMBODIMENT

Figure 5:
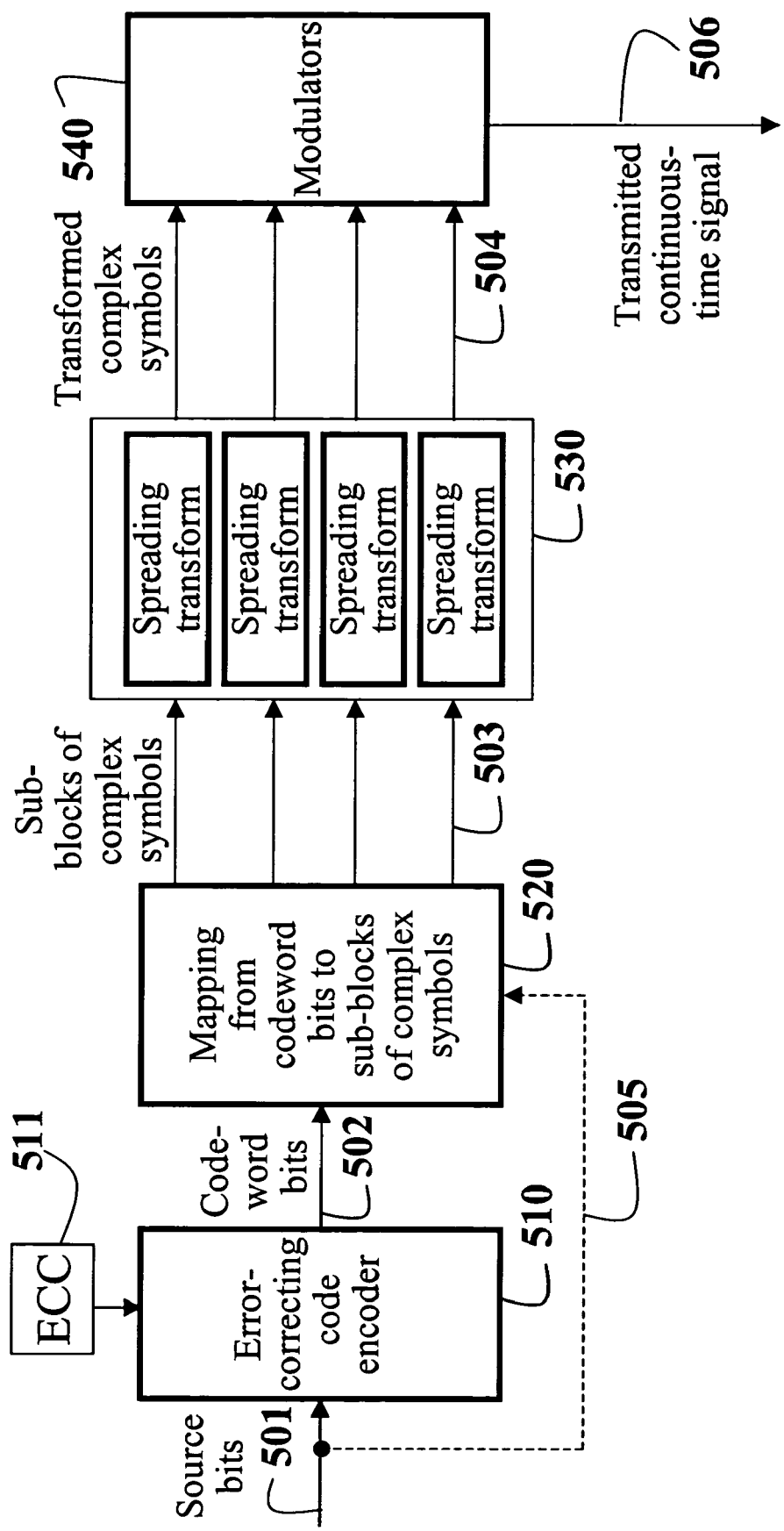
FIG. 5 is a block system diagram for an encoder according to the invention.

FIG. 5 shows an encoder 500 according to our invention. The encoder includes an error-correcting code encoder 510, a mapping unit 520, a block of parallel spreading transformers 530, and modulators 540, all connected serially. The input signal 501 to the encoder is in the form of a sequence of blocks of bits. The blocks are denoted by a discrete time t.

Each block of bits 501 is denoted by $s_i[t]$. The block of bits is encoded into codeword bits 502 using the encoder 510 that uses an error-correcting code (EEC) 511. Alternatively, the block of bits 501 can be passed directly 505 to the mapping unit 520. This is equivalent to using a rate-1 code.

The output of the encoder of the error-correcting code is a codeword 502 for each block of bits. We denote the codeword bits by $c_j[t]$.

The codewords 502 (or the source bits) are mapped 520 to sub-blocks of complex numbers 503. Any conventional method of mapping bits into "constellations" of complex numbers can be used. In the preferred embodiment of the invention, a binary phase-shift keying (BPSK) mapping or a quadrature phase-shift keying (QPSK) mapping is used. If a BPSK mapping is used, then a zero bit is mapped to a complex number +1.0, while a one bit is mapped to a complex number −1.0. If a QPSK mapping is used, then the bits are be mapped two at a time, with a '00' mapped to $(1+i)/\sqrt{2}$, a '01' mapped to $(-1+i)/\sqrt{2}$, a '11' mapped to $(-1-i)/\sqrt{2}$, and a '10' mapped to $(1-i)/\sqrt{2}$.

The output of the mapping method is a sequence of N complex numbers, denoted by $u_i[t]$. The N complex numbers are partitioned into P sub-blocks 503 of possibly varying lengths. We denote the length of the $a^{th}$ sub-block by $n_a$, where $n_a$ is a power of two. Therefore, the relation $$N = \sum_{a=1}^{P} n_a$$

holds. We state more specifically that $n_a = 2^{B_i}$, where $B_i$ is greater than or equal to one.

Disambiguating Spreading Transforms

In the next step of the encoder, each sub-block of the complex numbers is multiplied 530 by an $n_a \times n_a$ sparse spreading transform matrix. We denote the $n_a$ input complex numbers by $u_m$, the spreading transform matrix by $U_{lm}$, and the $n_a$ output transformed complex numbers 504 by $x_l$. The relationship between the input and transformed complex numbers is $$x_l = \sum_{m=1}^{n_i} U_{lm} u_m. \qquad (9)$$

If any one of the outputs $x_l$ is received correctly, then our spreading transform 530 can reconstruct unambiguously all the inputs $u_m$, even if all other outputs are erased by the channel. We call spreading transforms that have this property 'disambiguating spreading transforms'.

Note that the prior art Walsh-Hadamard transforms (WHT) are not disambiguating spreading transforms. With the WHT, if all but one of the outputs is erased, then there can be ambiguity during the reconstruction, as described above.

Besides the fact that our transforms are disambiguating, another property of the spreading transforms according to the invention is that the transforms are unitary transforms. This implies that the Euclidean distance between two sequences of complex numbers is identical to the Euclidean distance between the two sets of transformed complex numbers. This is a good property for the transform to have, because it means that if an error is made in recovering the input sequence from a corrupted version of the transformed sequence, the error will tend to be small.

Disambiguating Spreading Transforms as Factor Graphs

Figure 6:
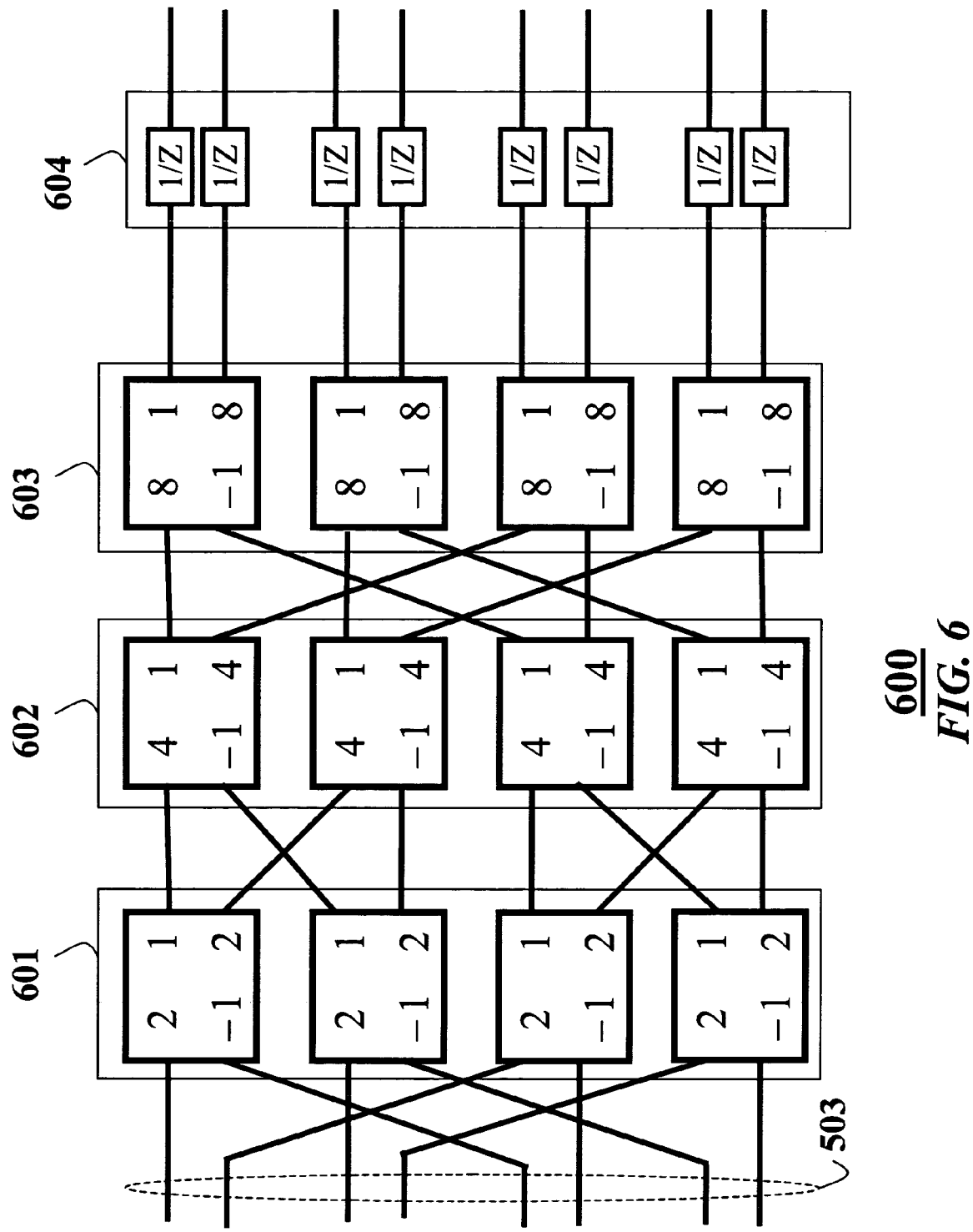
FIG. 6 is a block diagram of a factor graph for a disambiguating spreading transform.

FIG. 6 shows a preferred embodiment of the invention where the disambiguating spreading transform is constructed as a normal factor graph 600. We call this a disambiguating spreading transform factor graph (DSTFG). The example factor graph 600 is for $n_a=8$. This DSTFG is constructed using stacks of butterfly factor nodes 601-603, followed by a single stack of normalization factor nodes 604.

The $n_a$ input complex variables $u_m$ are represented in the DSTFG by $n_a$ lines 503 entering from the left. The DSTFG contains B stacks of $n_a/2$ butterfly factor nodes 601-603, followed by a single stack of identical normalization nodes 604.

Recall that each butterfly factor node is defined by the four constants A, B, C, and D, which constrain the input and output variables of the butterfly factor node according to equations (6) and (7) above. In the butterfly factor node in the $k^{th}$ stack of an STFG, the constants A, B, C, and D are given by $$A=D=2^k, B=1, C=-1. \quad (10)$$

In the DSTFG 600, the butterfly factor nodes are connected by a regular, recursive 'wiring structure' as shown in FIG. 6. This wiring structure is identical to that used in the prior art fast Fourier transforms and the prior art fast Walsh-Hadamard transforms.

Figure 1:
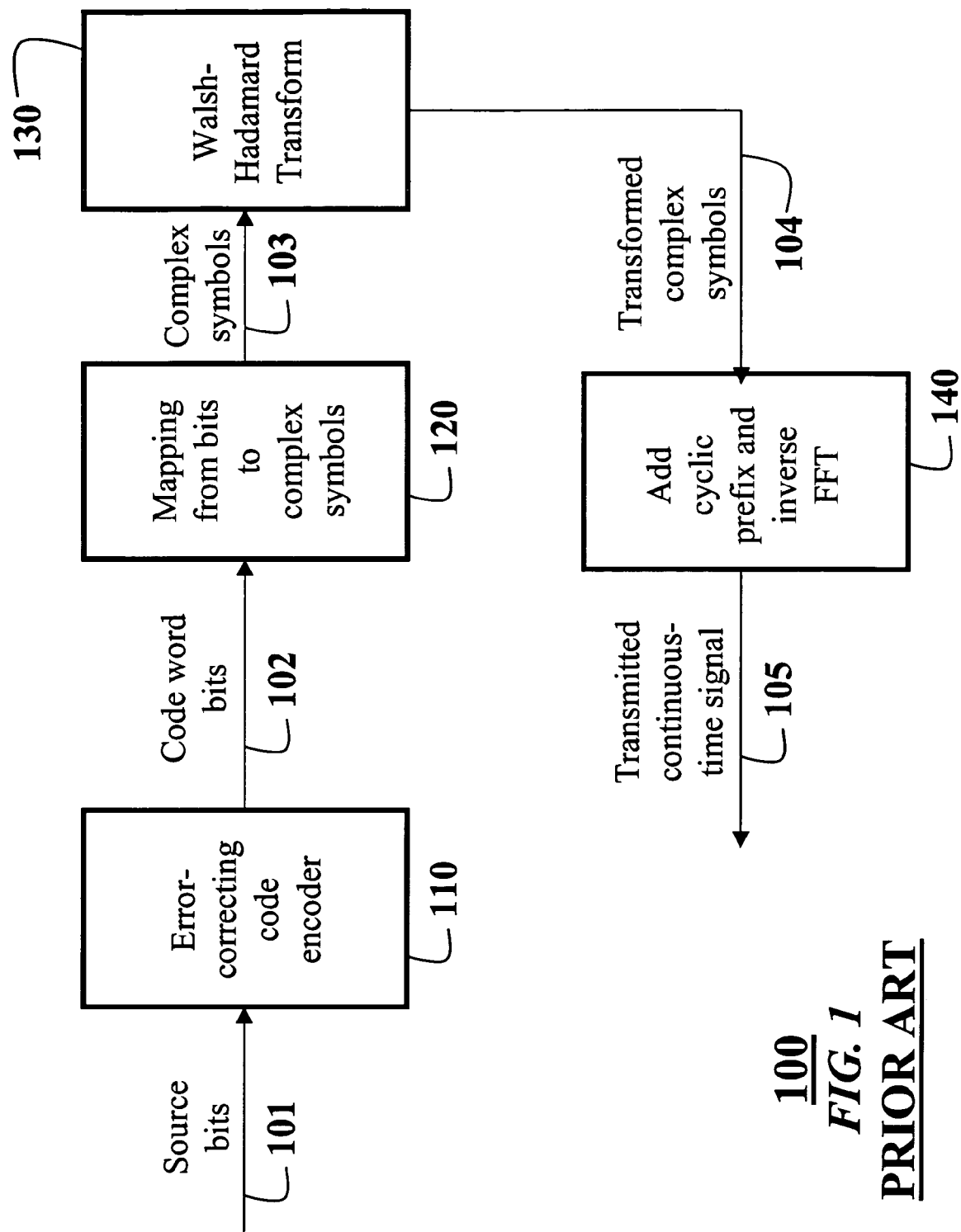
FIG. 1 is a block system diagram for a prior art transmitter for an OFDM system using MC-CDMA.
Figure 2:
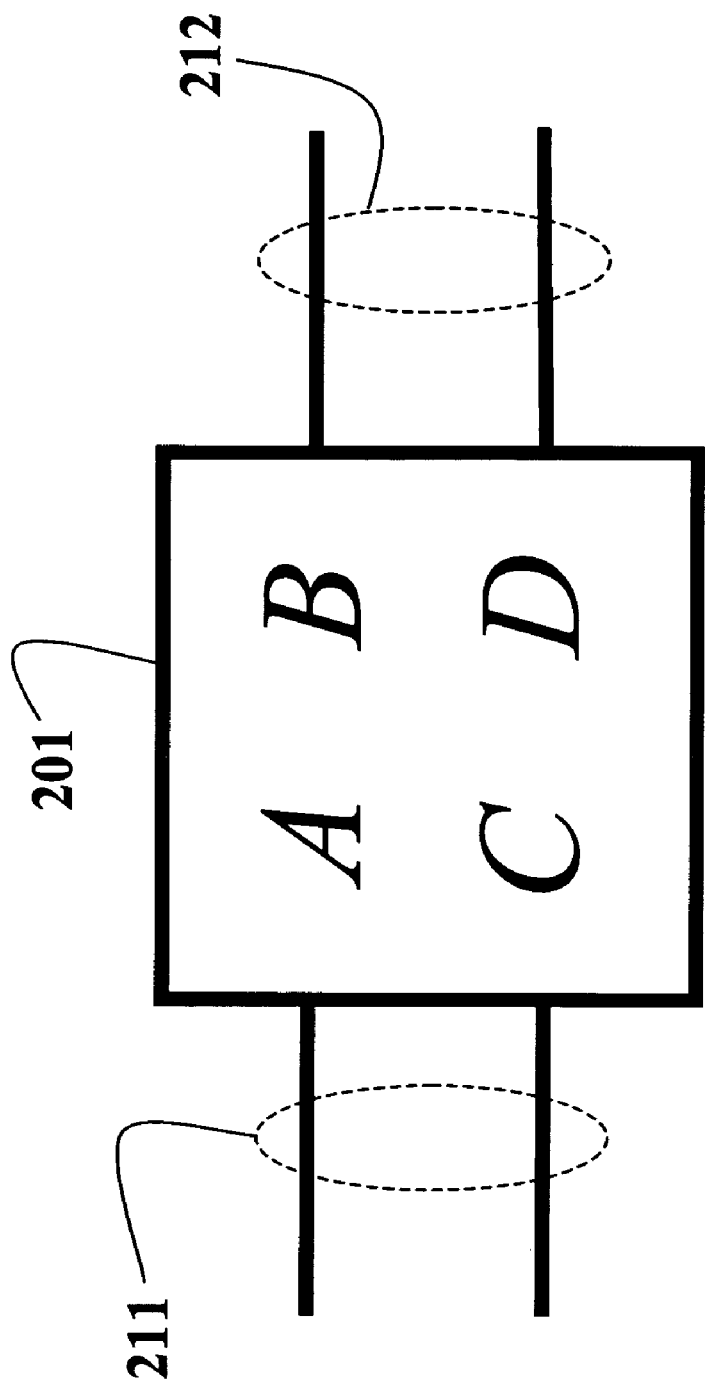
FIG. 2 is block diagram of a prior art butterfly factor node.
Figure 3:
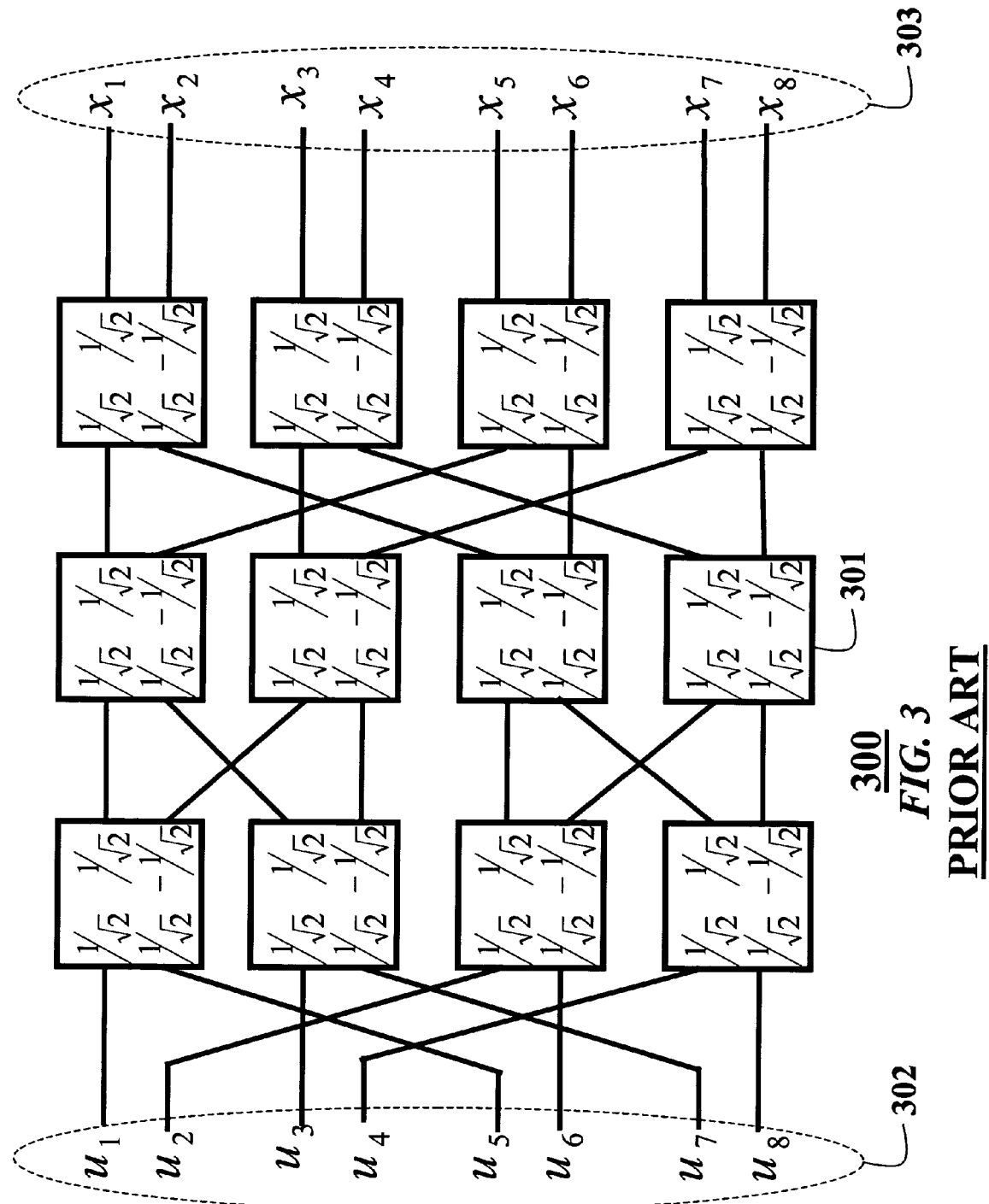
FIG. 3 is a block diagram of a factor graph for a prior art Walsh-Hadamard transform matrix.
Figure 4:
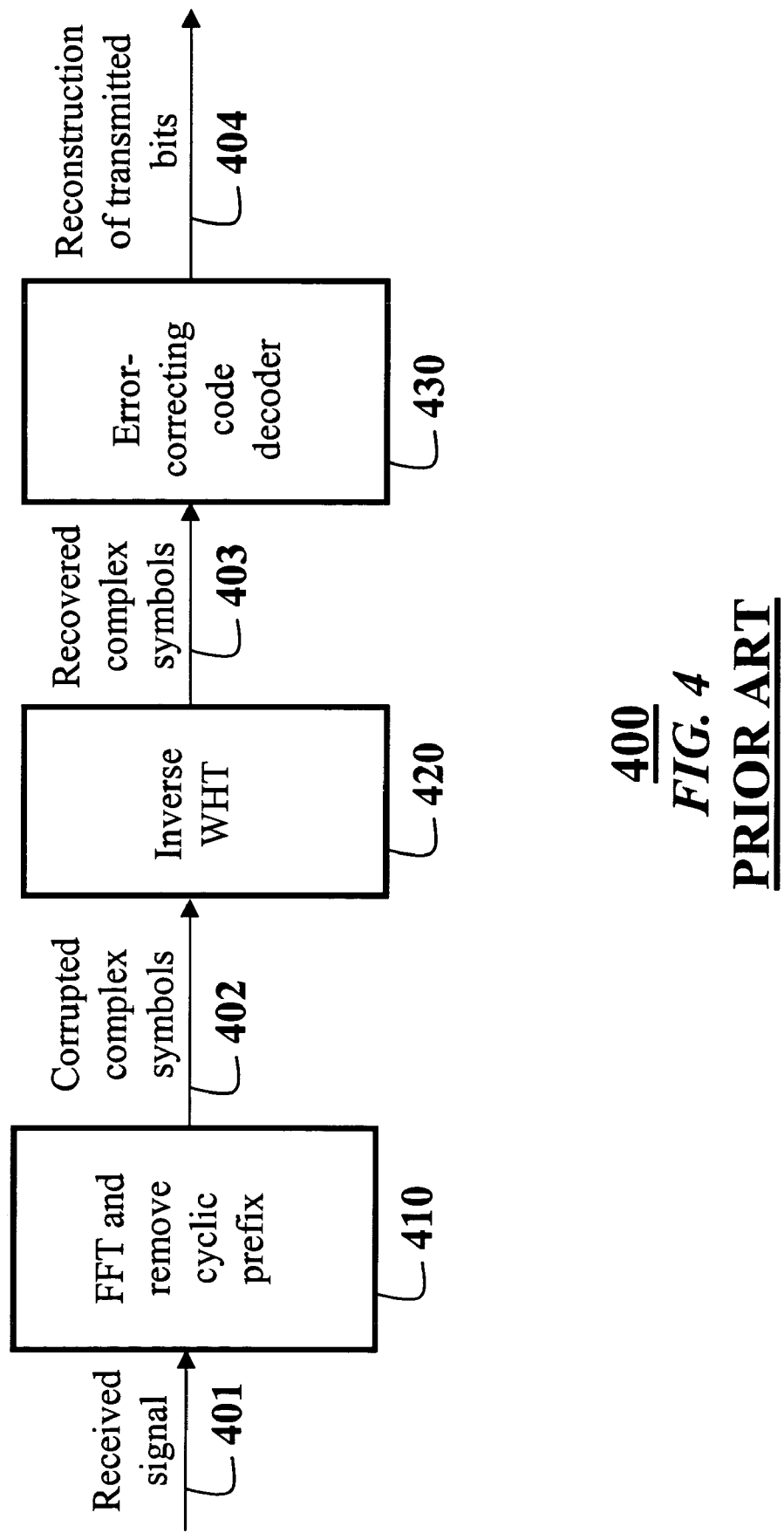
FIG. 4 is a block system diagram for a prior art receiver for an OFDM system using MC-CDMA.

Note however, that in a fast Fourier transform or fast Walsh-Hadamard transform, the so-called 'twiddle-factors' corresponding to the constants A, B, C, and D are completely different, see FIG. 3.

In the final normalization stack 604, each output is multiplied by a normalization factor 1/Z 604, where $$Z = \sqrt{\sum_{k=0}^{2B-1} 2^{2k}}. \quad (11)$$

Thus, for example, when B=1, Z=√5, while when B=2, Z=√85.

The DSTFG 600 can be used to perform the evaluation in Equation (9) in a 'fast' way, which uses only on the order of $n_a \log n_a$ operations. To use the DSTFG in this way, the $n_a$ inputs are first transformed by the first stack of butterfly factor nodes. The results are fed to the second stack of butterfly factor nodes, and so on. After exiting the last stack of butterfly factor nodes, the outputs are normalized in the stack of normalization factor nodes.

Figure 7:
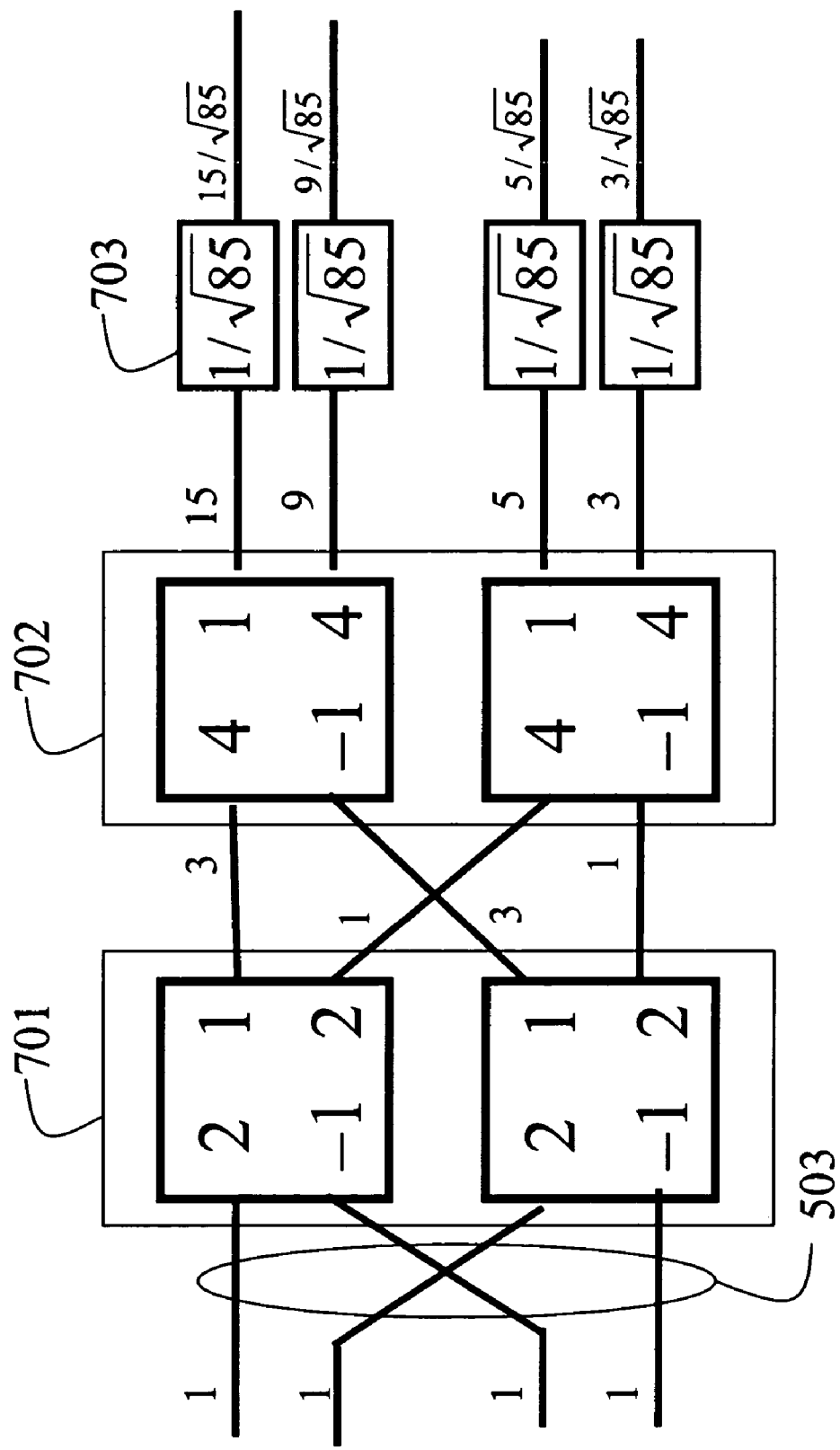
FIG. 7 is a block diagram for a factor graph for fast encoding using a disambiguating spreading transform.

FIG. 7 shows this process 700 for a DSTFG with $n_a$=4. The inputs complex symbols 503 are all one. After passing through the first stack of butterfly factor nodes 701, the symbols are 3, 1, 3, and 1 respectively. After passing through the second stack of butterfly factor nodes 702, the symbols are 15, 9, 5, and 3 respectively. Finally, after passing through the normalization factor nodes 703, the output symbols are 15/√85, 9/√85, 5/√85, and 3/√85.

The matrix $U_{lm}$ corresponding to the DSTFG can be determined by providing sequences of inputs that have a single one in the $k^{th}$ position, and all other inputs are zeros. The set of outputs corresponds to the $k^{th}$ column of the matrix $U^{lm}$. For example, for $n_a$=4, the matrix is $$U_{lm} = \frac{1}{\sqrt{85}} \begin{pmatrix} 8 & 2 & 4 & 1 \\ -2 & 8 & -1 & 4 \\ -4 & -1 & 8 & 2 \\ 1 & -4 & -2 & 8 \end{pmatrix}. \quad (12)$$

When there is no noise, but erasures, we can deduce the input variables from only a single output. For example, if the possible inputs are +1 and −1 (BPSK mapping), and the first output is 9/√85, we can deduce unambiguously that the input variables must have been 1, −1, 1, and −1, to obtain 8−2+4−1=9. This disambiguation property of the transforms according to our invention yields better performance in fading channels than prior art methods.

The outputs of the spreading transform are concatenated to form a block of complex symbols 504 that we denote by $x_i[t]$. The complex symbols $x_i[t]$ are then modulated 540 into continuous-time signals 506 that are appropriate for transmission over the channel. In an OFDM system, the modulation step 540 includes two sub-steps. In the first sub-step, a cyclic prefix is added, and in the second sub-step, an inverse FFT is applied.

Overall Structure of the Decoder

Figure 8:
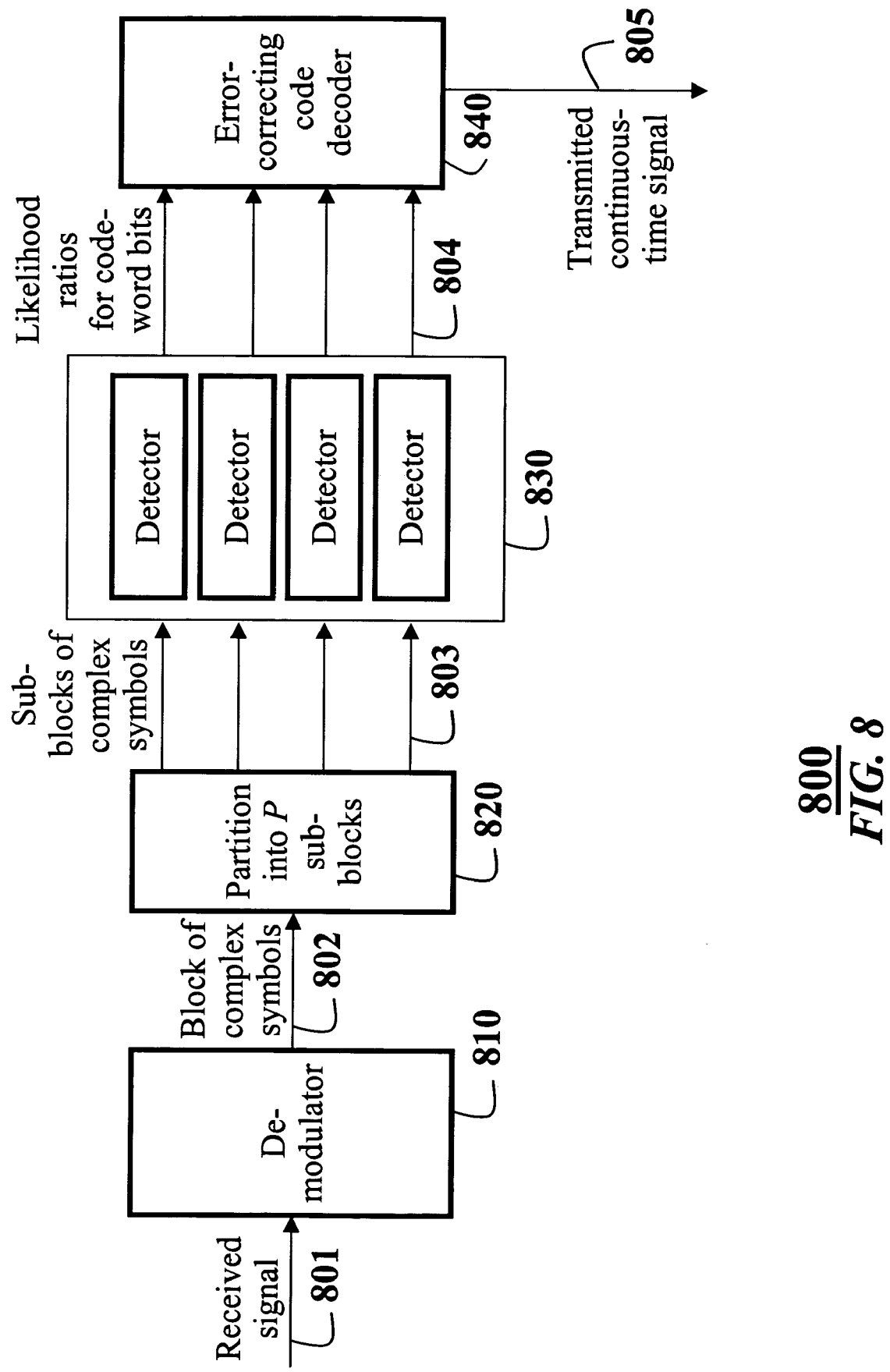
FIG. 8 is a block system diagram for a decoder according to the invention.

FIG. 8 shows a decoder 800 according to the invention. The received signal from the channel 801 is first demodulated 810 into a series of blocks of complex numbers 802. Each block of complex numbers is then divided 820 into P sub-blocks 803, corresponding to the sub-blocks used in the encoder 600. Using parallel detectors 830 for the spreading transform, the complex symbols are converted into a set of likelihood ratios 804 for the original codeword bits. Finally, the likelihood ratios are used as input for a decoder 840 of the selected error-correcting code. The decoder outputs a set of bits 805 corresponding to the original input.

In the first step of the decoder, the received signal 801, perhaps corrupted by the channel, is demodulated 810 into a block of complex numbers $y_i[t]$ 802. In an OFDM system, this demodulator includes a detector that implements an FFT, and a sub-step for removing the cyclic prefix.

The Spreading Transform Detector

The detector takes as input a sequence of corrupted complex symbols $y_i[t]$ 803. These complex symbols are related to the transmitted symbols $x_i[t]$ by an effective channel model as given in Equation (1). We assume that the decoder has knowledge of the channel attenuation parameters $H_i[t]$. The overall detector is, in fact, a concatenation of P smaller detectors, and each smaller detector uses one of the P spreading transforms used in the encoder. Thus, the input to one of these smaller detectors is a sub-block of the symbols $y_i[t]$, which we denote by $y_i^a[t]$, for the $a^{th}$ sub-block.

The desired output from any one of these smaller detectors is a set of marginal likelihoods 804 for the sub-block of the codeword bits $c_i[t]$ corresponding to the symbols input to the spreading transform. We denote this sub-block by $c_i^a[t]$, and we denote the marginal likelihood that bit $c_i^a[t]$ is a zero given the received set of complex symbols $\{y_i^a[t]\}$ by $p(c_i^a[t]=0|\{y_i^a[t]\})$, and similarly for the likelihood that a bit is a one.

In the preferred embodiment of the invention, we obtain these marginal likelihoods using an 'optimal' detector. The optimal detector functions by determining a probability for each possible configuration of the sub-set of the codeword bits $c_i^a[t]$, given the received symbols $y_i^a[t]$. Then, the detector sums the probabilities of the possible sub-blocks with a codeword bit $c_i^a[t]$ equaling zero, and compares the sum with a sum of the probabilities of the possible sub-blocks with code-word bit $c_i^a[t]$ equaling one.

A variety of approximate detectors can also be used. For example, a detector based on a belief-propagation method can be used, see F. R. Kschischang, B. J. Frey, and H. A. Loeliger, "*Factor Graphs and the Sum-Product Algorithm,*" IEEE Transactions on Information Theory, vol. 47, pp. 498-519, February 2001.

The concatenated output 804 of the detectors is a set of marginal likelihoods for each codeword bit. In the next step of the overall decoder, these marginal likelihoods are used as inputs for a soft-input decoder 840 of the selected error-correcting code. The output 805 of the decoder is an estimate of the original input bits $s_i[t]$ 501.

Effect of the Invention

Simulations show that the performance of a system according to the invention is considerably better than prior art systems based on Walsh-Hadamard transforms, or based on 2×2 spreading transforms. The amount of the gain depends on the specific fading model considered and error-correcting code used. The gain from using larger disambiguating spreading transforms is always substantial.

It should be noted that the invention can be applied to MIMO, OFDM, TDMA, and systems that use frequency hopping as known in the prior art. In a system that uses frequency hopping, one normally strives to prevent two users from using the same frequency at the same time. However, an alternative is to allow such clashes, and recover from the resulting interference using the method described in the invention.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for encoding a sequence of blocks of input bits to be transmitted over a wireless channel, comprising:
   converting each block of input bits to a codeword;
   mapping each codeword to a plurality of a sub-blocks of complex numbers;
   multiplying each sub-block of complex numbers by a disambiguating spreading transform to obtain a sub-block of transformed symbols;
   constructing a normal factor graph for the disambiguating spreading transform, the normal factor graph including a plurality of stacks of butterfly factor nodes and a single stack of normalization factor nodes, the number of butterfly factor nodes in each stack being half the number of complex symbols in the sub-block of the complex symbols;
   defining each normalization factor node by a normalization factor $1/Z$, where $$Z = \sqrt{\sum_{k=0}^{2B-1} 2^{2k}},$$

and where B is related to a number N of complex symbols in a sub-block by $N=2^B$ and B is an integer greater then or equal to 1; and
   modulating each sub-block of transformed symbols.

2. The method of claim 1, in which the converting uses an error-correcting code.

3. The method of claim 1, in which the block of input bits are converted directly to the codeword in a rate-1 code.

4. The method of claim 1, in which the mapping uses binary phase-shift keying.

5. The method of claim 1, in which the mapping uses quadrature phase-shift keying.

6. The method of claim 1, in which the sub-blocks have variable lengths.

7. The method of claim 6, in which each length is a power of two number.

8. The method of claim 1, in which the disambiguating spreading transform is a unitary transform.

9. The method of claim 1, further comprising:
   defining each butterfly factor node by constants A, B, C, and D, which constrain input variables x and output variables y of the butterfly factor node according to $y_1=Ax_1+Bx_2$ and $y_2=Cx_1+Dx_2$, where the constants of a $k^{th}$ stack of the normal factor graph are $A=D=2^k$, $B=1$, $C=-1$.

10. The method of claim 1, further comprising:
    connecting the butterfly factor nodes in the normal factor graph by a regular, recursive wiring structure.

11. The method of claim 1, in which the modulating further comprises:
    adding a cyclic prefix to each sub-block of transformed symbols; and
    applying an inverse FFT to each sub-block and appended cyclic prefix.

12. The method of claim 1, further comprising:
    receiving sub-block of transformed symbols;
    demodulating each received sub-block of transformed symbols to a received block of complex numbers;
    partitioning each demodulated block of complex numbers into a plurality of received sub-blocks of complex numbers; and
    converting each received sub-block of complex numbers to a set of likelihood ratios for the bits in a corresponding sub-block of the codeword.

13. The method of claim 12, further comprising:
    decoding each set of likelihood ratios according to a selected error-correcting code.

14. The method of claim 12, in which the demodulating further comprises:
    applying a fast Fourier transform to each set of likelihood ratios; and
    removing a cyclic prefix.

15. The method of claim 12, in which the set of likelihood ratios is obtained by an optimal detector, the optimal detector determining a probability for each possible bit in a sub-block of codeword bits corresponding to a sub-block of input complex numbers.

16. The method of claim 12, in which the set of likelihood ratios is obtained using belief-propagation.

17. The method of claim 1, in which the block of input bits are decoded unambiguously in a receiver even if only one block of symbols corresponding to the block of input bits is received correctly.

* * * * *